United States Patent
Chen et al.

(10) Patent No.: US 6,928,873 B2
(45) Date of Patent: Aug. 16, 2005

(54) SILICON DUAL INERTIAL SENSORS

(75) Inventors: Shyu-Mou Chen, Longtan, Taoyuan (TW); Sheau-Shi Tzuoo, Longtan, Taoyuan (TW); Chung-Ta Kau, Longtan, Taoyuan (TW)

(73) Assignee: Chung-Shan Institute Of Science And Technology, Taoyuan (TW)

( * ) Notice: Subject to any disclaimer, the term of this patent is extended or adjusted under 35 U.S.C. 154(b) by 0 days.

(21) Appl. No.: 10/699,490

(22) Filed: Nov. 1, 2003

(65) Prior Publication Data

US 2005/0092086 A1   May 5, 2005

(51) Int. Cl.$^7$ ................................................. G01P 9/04
(52) U.S. Cl. ................................. 73/504.04; 73/504.12
(58) Field of Search ..................... 73/504.04, 504.16, 73/504.12, 504.14

(56) References Cited

U.S. PATENT DOCUMENTS 5,767,405 A * 6/1998 Bernstein et al. ........ 73/504.16
6,257,059 B1 * 7/2001 Weinberg et al. ........ 73/504.16

* cited by examiner

Primary Examiner—John E. Chapman (57) ABSTRACT

A silicon dual inertial sensor made of a (110) silicon chip comprises at least a proof-mass, which is connected to a corresponding inner frame with a plurality of sensing resilient beams to make it easier for the proof-mass to move perpendicular to the surface of the silicon chip (defined as z-axis), and each inner frame is connected to an outer frame with a plurality of driving resilient beams, or connected to common connection beams, which are then connected to a central anchor with common resilient supporting beams to make it easier for the inner frame to move in parallel with the surface of the silicon chip (defined as y-axis). Each inner frame is driven by a driver to move in an opposite direction along the y-axis, and also move the proof-mass in the opposite direction along the y-axis. If there is a rotation rate input along the x-axis, it will generate a Coriolis force to make each proof-mass move in the opposite direction of the z-axis. If an acceleration is input along the z-axis, the specific force will move the proof-masses with the same direction. When the proof-masses move or oscillate, the capacitance of the capacitor formed with sensing electrodes will change due to the change of the distance. The moving distance can be obtained by measuring the change of the capacitance. Because the rotation rate outputs an alternating signal, and the acceleration outputs a direct signal, they can be separated with signal processing. The deep vertical etching characteristics of the (110) silicon chip is utilized to make the driving beam in order to control the driving resonance frequency more precisely, and improve the yield rate and the performance of the gyroscope.

18 Claims, 7 Drawing Sheets y, vibration direction ⟷ x, rotation rate direction

⊗ coriolis force direction

↕ y, vibration direction  ⟷ x, rotation rate direction

⊗ coriolis force direction

SILICON DUAL INERTIAL SENSORS

FIELD OF THE INVENTION

The present invention relates to dual inertial sensors made with micro-machining technology, including both functions of a gyroscope (angular rate sensor) and an accelerometer (acceleration sensor), and more particularly to dual inertial sensors made with bulk-micromachining and wet etching on (110) silicon chips.

BACKGROUND OF THE INVENTION

Figure 1:
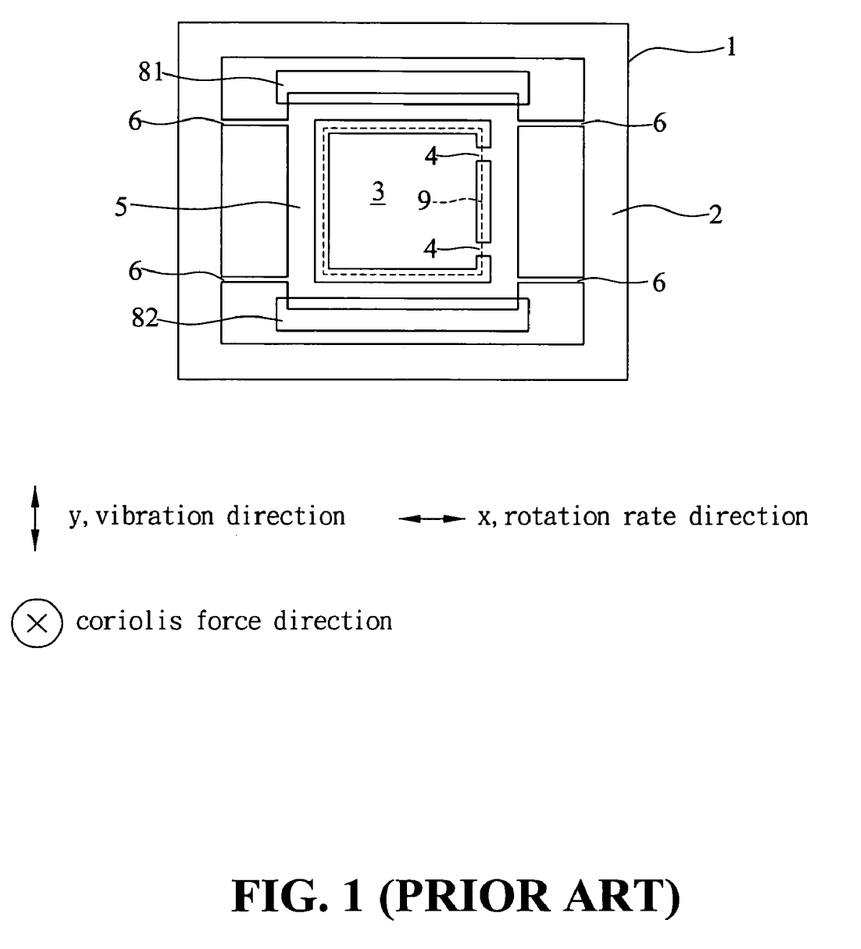
FIG. 1 shows the top view of a dual inertial sensor in related arts.

A conventional structure of dual inertial sensors made with bulk-micromachining is shown in FIG. 1. It is made of (100) silicon chips 1, comprising an outer frame 2. The outer frame 2 comprises one or more inner frame 5, and each inner frame 5 is further comprising a proof-mass 3. The proof-mass 3 is connected to the inner frame 5 by a plurality of sensing flexible beams 4, and the inner frame 5 is connected to the outer frame 2 by a plurality of driving flexible beams 6. The sensing beams 4 facilitate the proof-mass 3 to move perpendicular to the surface of the silicon chip defined as z-direction), and the driving beams 6 facilitate the proof-mass 3 to move in parallel to the surface of the silicon chip (defined as y-direction). Two glass sheets (not shown in FIG. 1) are placed on both sides of the silicon chip 1, and connected to the outer frame 2. The thin metal film electrodes 81, 82 are electro-plated on the glass sheets facing the silicon chip surface and corresponding to the two edges of the inner frame 5, respectively. The two thin metal film electrodes 81, 82, with the surface of the inner frame 5, will form edge effect electrostatic driving capacitors c8p, c8n. A thin metal film electrode 9 is electrode-plated on the glass sheets facing the silicon chip surface and the proof-mass 3. The thin metal film electrodes 9, with the surfaces of the proof-mass 3, will form two sensing capacitors c9p, c9n. The alternating driving voltage on the driving capacitors c8p, c8n will make the inner frame 5 and the proof-mass 3 vibrate along y-axis. If there is an angular velocity $\Omega$ along x-axis, there will be a Coriolis force F making the proof-mass 3 vibrate along z-axis. The angular rate can be obtained by measuring the amplitude of the z-direction vibration of the proof-mass 3. If there is an acceleration applied along the z-axis, the specific force will move the proof-mass 3 with respect to the inner frame. The acceleration can be obtained by measuring the displacement made by the movement of proof-mass with respect to the inner frame. When the proof-mass 3 moves, the capacitances of the sensing capacitor c9p, c9n will change due to the changes in the capacitor's gap. The displacement of the proof-mass can be obtained by measuring the difference of the capacitances of the capacitors c9p, c9n. As the output signal generated by the angular rate is an alternating signal, and the output signal generated by the acceleration is a low frequency or direct current signal, a signal processing method can be applied to separate the angular rate signal from the acceleration signal.

The proof-mass 3 and its sensing beams form a z-axis mass-spring vibration system. Similarly, the unit, consisting of an inner frame 5, sensing beams 4, and proof-mass 3, together with its driving beams 6, forms a y-axis mass-spring vibration system. As the amplitude of the vibration generated by the driving force of the driver is small, the resonance effect of a vibration system is used to amplify the amplitude. The amplification ratio Q is related to operating frequency and damping coefficient. The closer the operating frequency of the driver is to the resonance frequency of the vibration system, the larger the ratio Q. Similarly, the amplitude generated by the Coriolis force must rely on the resonance effect for amplification. Because the vibration frequency generated by Coriolis force is the same as that of the driving force, the resonance frequency of the sensing axis must be the same as that of the driving axis in order to generate sufficiently large output signals.

Figure 2:
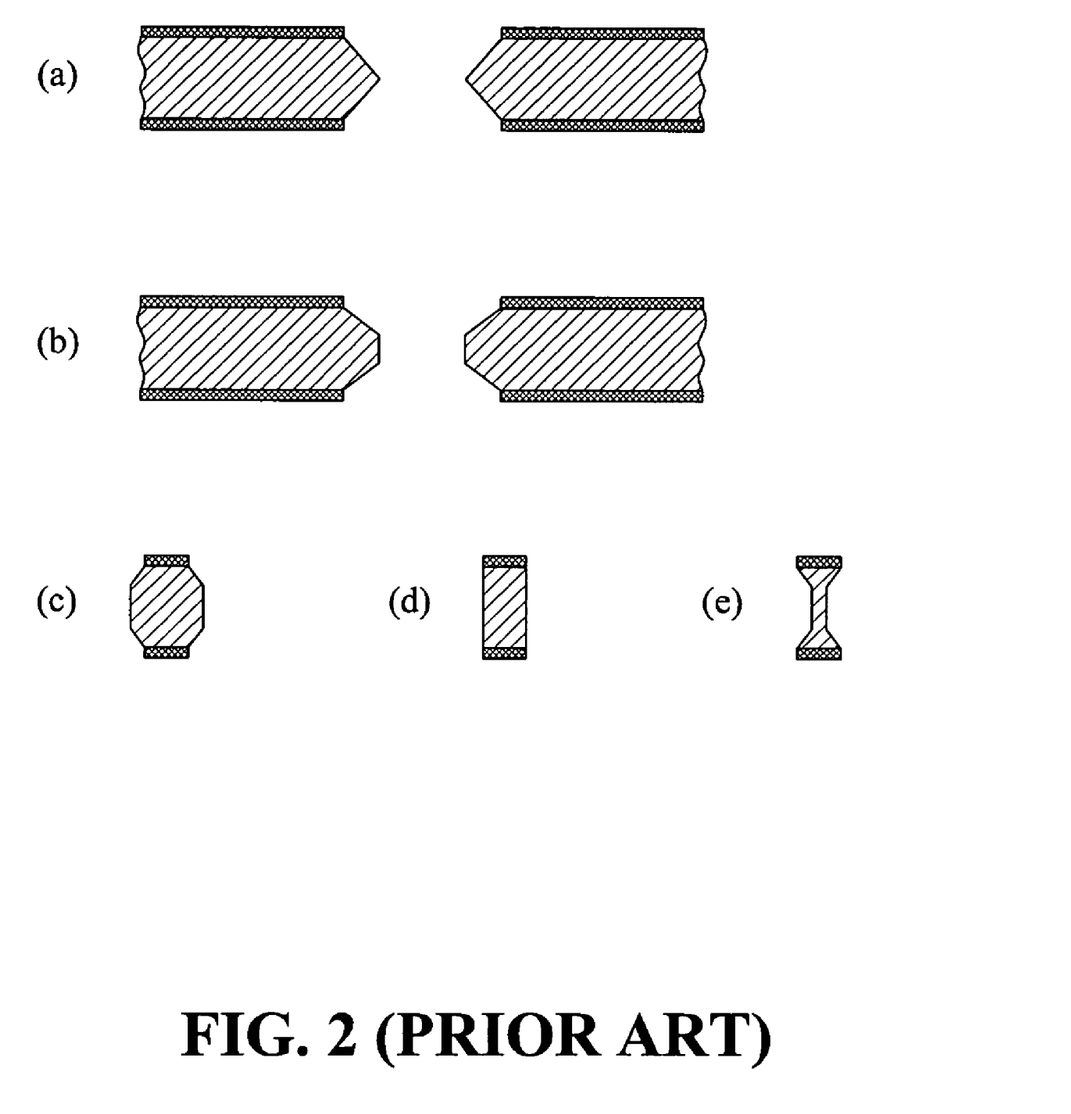
FIG. 2 shows the etching process of the driving-beam on a (100) silicon chip in related arts.

The major drawback of the aforementioned sensors is in the manufacturing process of the driving beams. As shown in FIG. 2, the etching is first applied on both sides of the silicon chip. As the speed of silicon wet etching is related to the lattice direction, the etching is slowest along the <111> direction. It is virtually impossible to etch along this direction. Hence, the initial stage of the etching would be as shown in FIG. 2(a). The slant lines represent the (111) facets. If the etching continues, it will proceed along the <110> direction from the intersection of two (111) facets, as shown in FIG. 2(b). FIGS. 2(c)–2(e) show the side views of different stages when both sides of the driving beam are etched. When the etching is perpendicular to the surface, the process should stop and the silicon chips should be removed from the etching solution. However, as there is no automatic mechanism to stop the etching as in the (111) facet, it is hard to control the width of the driving beam. The width of the driving beam affects the coefficient of elasticity, which in turn will affect the resonance frequency. If the width of the driving beam is not accurate, the resonance frequency will be different from that of the sensing beams, and deviate from the original design. For vibration systems with larger Q values, the tolerance of the deviation is smaller. This poses a major problem for the quality of the products.

SUMMARY OF THE INVENTION

The major features of the present invention are: (1) dual inertial sensors made by etching (110) silicon chip whose width can be accurately controlled during the etching process; (2) the design to reduce the air damping of the (110) silicon proof-mass; (3) preventing the proof-mass from sticking to glass sheets; and (4) built-in temperature sensing capacitors placed in the chip area unaffected by the inertial force, and compensating the temperature error in the dual inertial sensors by direct measurement of the temperature changes in the chip.

The present invention will become more obvious from the following description when taken in connection with the accompanying drawings which show, for purposes of illustration only, a preferred embodiment in accordance with the present invention.

DETAILED DESCRIPTION OF THE INVENTION

Figure 3:
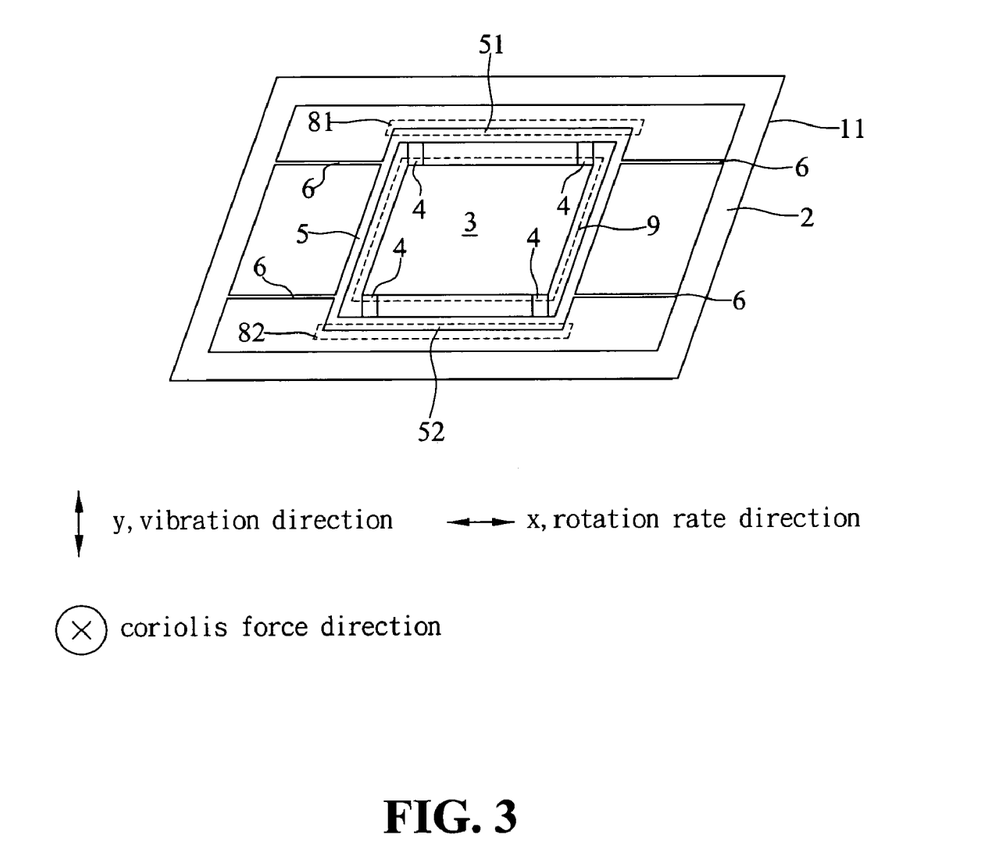
FIG. 3 shows the top view of a dual inertial sensor made with a (110) silicon chip in accordance with the present invention.

FIG. 3 shows the top view of a dual inertial sensor in accordance with the present invention. Its structure is made by wet etching a (110) silicon chip 11. It is shaped as a parallelogram, instead of a rectangular shown in FIG. 1. The sides of all the components are in parallel with the intersection line of the (110) silicon chip surface and the silicon lattice {1-1-1} facet or {1-11} facet. Any two sides form an angle of 109.48° or 70.52°; hence most of the components are shaped as parallelograms. Because the two {111} facets, namely {1-1-1} and {1-11}, of the (110) silicon chip are perpendicular to the {110} facet, and conventional KOH and EDP etching solutions etch {111} facet much slower than {100} or {110} facets, a vertical surface can be obtained by keeping the protective mask aligned with the intersection line of the (110) silicon chip surface and the {1-1-1} facet or the {1-11} facet during the etching process. In this embodiment, the structure comprises an outer frame 2. Inside the outer frame 2 there is an inner frame 5, and the inner frame 5 further comprises a proof-mass 3. The proof-mass 3 is connected to the inner frame 5 by a plurality of sensing resilient beams 4, and the inner frame 5 is connected to the outer frame 2 by a plurality of driving resilient beams 6. The sensing resilient beams 4 facilitate the proof-mass 3 to move perpendicular to the surface of the silicon chip (defined as z-direction), and the driving resilient beams 6 facilitate the inner frame 5 and the proof-mass 3 to move in parallel to the surface of the silicon chip (defined as y-direction). Two glass sheets 71, 72 (not shown in FIG. 3) are placed on both sides of the silicon chip 11, and connected to the outer frame 2. The thin metal film electrodes 81, 82 are electro-plated on the two glass sheets 71, 72 facing the silicon chip surface and the inner frame 5. The two thin metal film electrodes 81, 82 of each glass sheet, with the corresponding surface of inner frame 5, will form edge effect electrostatic driving capacitors c8p, c8n. A thin metal film electrode 9 is electrode-plated on the glass sheets 71, 72 facing the proof-mass 3. The thin metal film electrode 9, with the surfaces of the proof-mass 3, will form two sensing capacitors c9p, c9n. The alternating driving voltage on the driving capacitors c8p, c8n will make the inner frame 5 and the proof-mass 3 vibrate along y-axis. If there is an angular velocity Ω along x-axis, there will be a Coriolis force F making the proof-mass 3 vibrate along z-axis. The angular rate can be obtained by measuring the amplitude of the z-direction vibration of the proof-mass 3. If there is an acceleration applied along the z-axis, the specific force will move the proof-mass 3 with respect to the inner frame. The acceleration can be obtained by measuring the displacement made by the movement of the proof-mass with respect to the inner frame. When the proof-mass 3 moves, the capacitances of the sensing capacitors c9p, c9n will change due to the changes in the distance. The displacement of the proof-mass can be obtained by measuring the difference of the capacitances of the sensing capacitors c9p, c9n. As the output signal generated by the angular rate is an alternating signal, and the output signal generated by the acceleration is a low frequency or direct current signal, a signal processing method can be applied to separate the angular rate signal from the acceleration signal.

In this embodiment, the thickness of the sensing beam 4 can be controlled by the automatic etching stop of the p+ doped layer. On the other hand, the driving beam 6 is in parallel with the intersection line of the (110) silicon chip surface and {1-1-1} facet or the {1-11} facet, hence the etching can be automatically stopped to provide the accurate width of the driving beam 6. Therefore, the difference between the resonance frequency of the driving vibration system and that of the sensing vibration system can be accurately controlled.

Figure 4A:
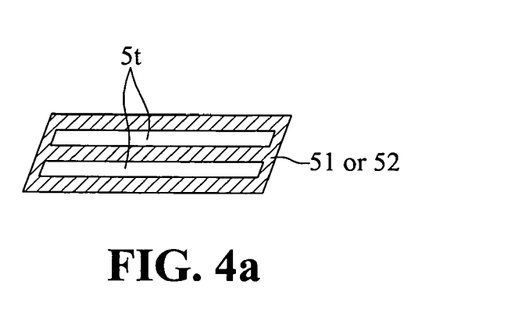
FIG. 4a shows the top view of the structure of an integrated driver.
Figure 4B:
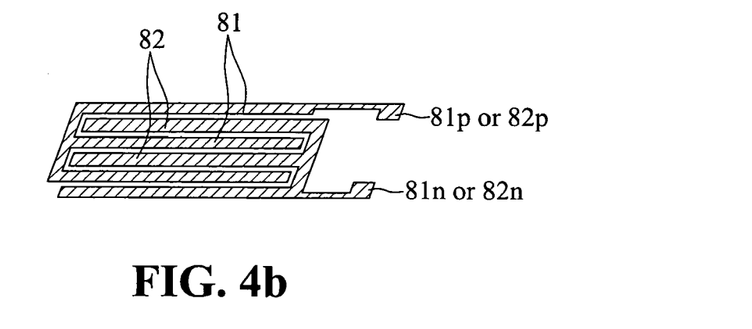
FIG. 4b shows stripe electrodes of the driver on the glass sheet surface and their bond pads.
Figure 4C:
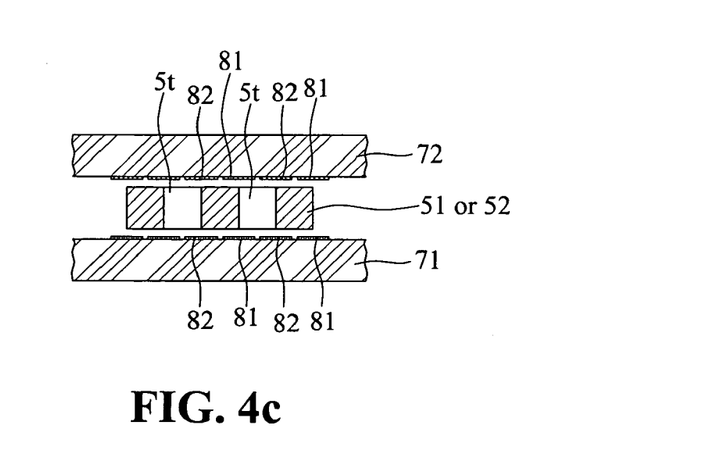
FIG. 4c shows the cross-section view of the structure of an integrated driver.

The driving force of the capacitor edge effect electrostatic driver is proportional to the length of the capacitor. To increase the driving force, it must increase the effective edge length. The driver can be designed in an integrated style, as shown in FIG. 4a. By widening the two sides 51, 52 of the inner frame 5, and etching a plurality of long trenches or slits 5t, two driving blocks 51, 52 are formed, and each trench or slit 5t can provide two edge effect drivers. The surfaces of glass sheet 71, 72 facing the surface of the corresponding driving block 51 have two sets of long stripe electrodes 81, 82, which interpose each other, and are parallel to the long trenches or slits 5t and connected to bond-pads 81p and 81n, respectively, as shown in FIG. 4.b. The relative position between long trenches or slits 5t on the driving block 51, and its corresponding stripe electrodes 81, 82 is shown in the cross-sectional view in FIG. 4.c. Two driving capacitors c81p, c81n are formed. Similarly, the surfaces of glass sheet 71, 72 facing the corresponding driving blocks 52 have two sets of long strip electrodes 81, 82 which interpose each other, and are parallel to the long trenches or slits 5t and connected to bond pad 82p and 82n, respectively. The surface of the driving block 52 and its corresponding long electrodes 81, 82 also form two driving capacitors c82p, c82n. By adjusting the phase of the external alternating voltage of the driving capacitors c81p, c81n, c82p, c82n to make the drivers exerting the force in the same direction, the driving force is increased for several times. The driving capacitors can also be used in measuring driving amplitude and to feedback for controlling driving amplitude.

Figure 5A:
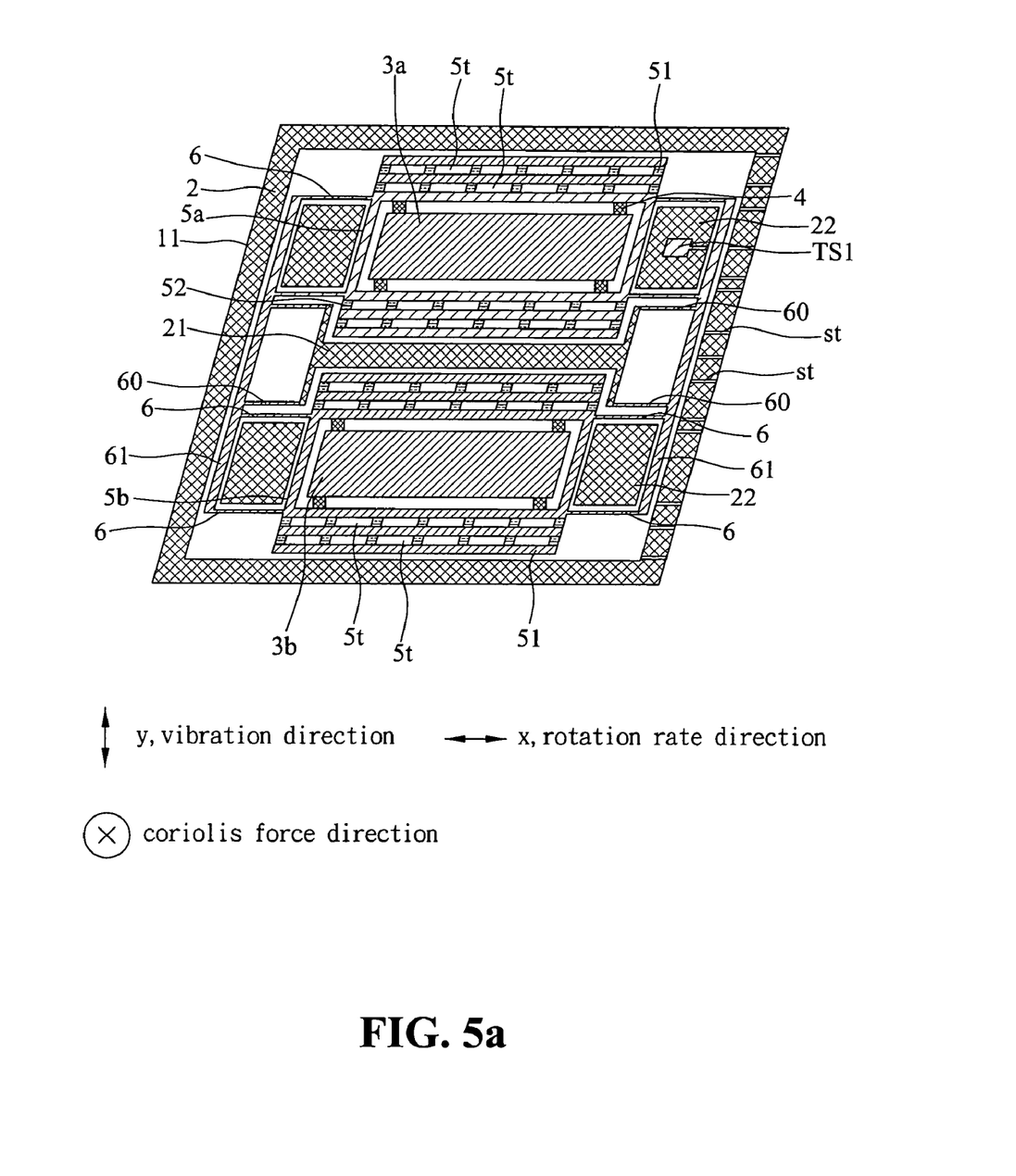
FIG. 5a shows the top view of the structure of (110) silicon chip of the preferred embodiment of the present invention.

FIG. 5a shows a preferred embodiment of a silicon dual inertial sensor of the present invention. The silicon dual inertial sensor comprises two structures shown in FIG. 3 and is also made by wet etching on a (110) silicon chip 11. This embodiment comprises an outer frame 2, which further comprises two inner frames 5a, 5b, a central anchor 21, and a plurality of connecting blocks 22. The inner frames 5a, 5b have proof masses 3a, 3b, respectively, which are connected to the corresponding inner frame by at least a sensing resilient beam 4. Each inner frame is connected to two common connecting beams 61 by at least a driving resilient beam 6, and then connected to the central anchor 21 by the common resilient supporting beam 60. Each surface of the silicon chip, with the exception of the areas of the outer frame 2, the central anchor 21 and the connecting blocks 22, is etched for about 3 mm. The sensing beams make it easier for the proof-masses 3a, 3b to move perpendicularly to the surface of the silicon chip (the z-axis), and the driving beams make it easier for the inner frames 5a, 5b to move along one of the directions of the surface of the silicon chip (the y-axis). The two sides 51, 52, perpendicular to the y-axis, of the inner frames are the driving bodies, and each surface comprises a plurality of long trenches or slits 5t, perpendicular to the y-axis.

Two glass sheets 71, 72 are placed on the front side and the back side of the silicon chip 11, respectively. The glass sheets 71, 72 are combined with the outer frame 2, the central anchor 21 and the connecting mass 22. The surface of each glass sheet facing the corresponding driving body 51 has two sets of long electrodes 81, 82, which interpose each other, and are parallel to the long trenches or slits 54 and connected to bond pads 81p and 81n, respectively, as shown in FIG. 4.b. The relative position between long trenches or slits 5t on the driving body 51, and its corresponding long electrodes 81, 82 is shown in the cross-sectional view in FIG. 4.c. Two driving capacitors c81p, c81n are formed. Similarly, the surface of each glass sheet facing the corresponding driving body 52 has two sets of long electrodes 81, 82, which interpose each other, and are parallel to the long trenches or slits 5t and connected to bond pads 82p and 82n, respectively. Each surface of each driving body 52 and its corresponding long electrodes 81, 82 also form two driving capacitors c82p, c82n.

The surfaces of the glass sheets 71, 72 facing the surfaces of each proof-mass are electroplated with metal thin film electrodes 9, which are connected to bond pads 9p, 9n, respectively, and form sensing capacitors c9p, c9n with the surfaces of each proof-mass.

Figure 5B:
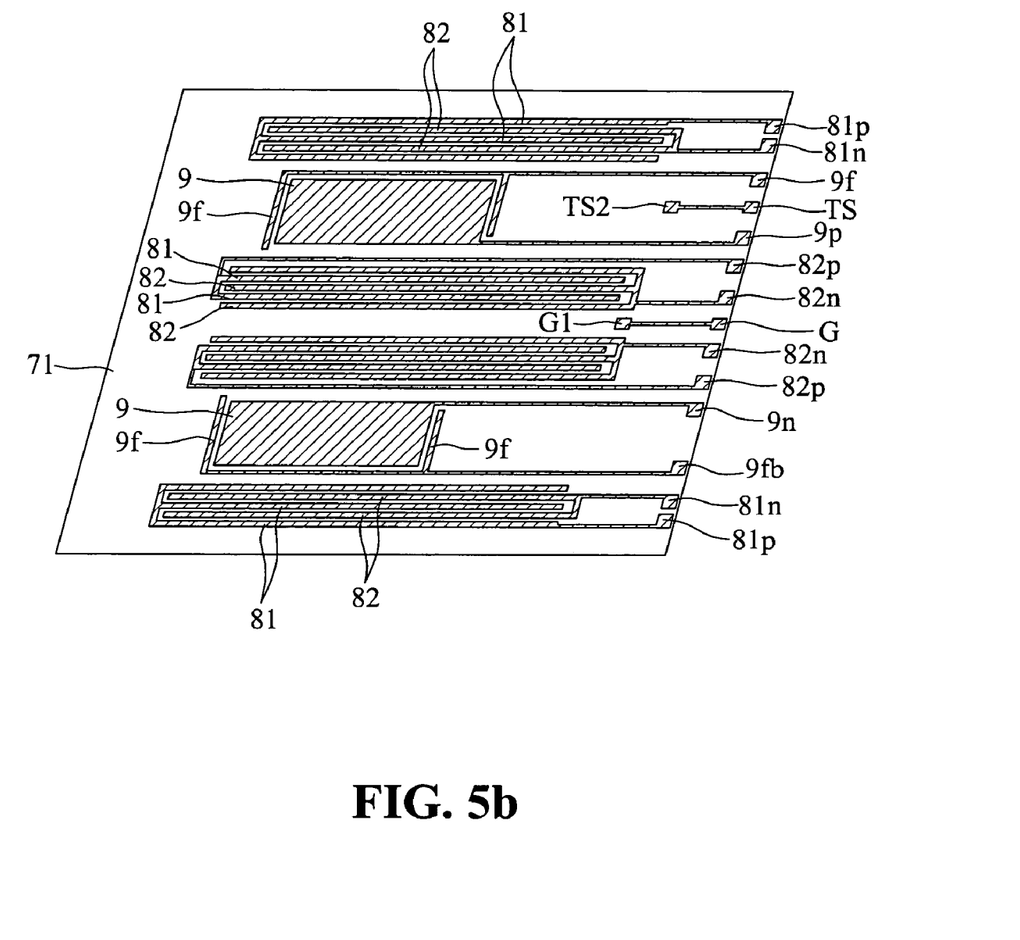
FIG. 5b shows the driving stripe electrode pair, sensing electrodes and their bond pads on the glass sheets of the preferred embodiment of the present invention.

By adjusting the phase of the external alternating voltages on the driving capacitors, it is possible to make the proof-masses 3a, 3b move in the opposite directions of y-axis. If there is a rotating angular speed Ω in the x-axis direction, there will be a Coriolis force to move the proof-masses 3a, 3b in the opposite direction of z-axis. If an acceleration is input along the z-axis, the specific force will move the proof-masses 3a, 3b along the z-axis. When the proof-masses 3a, 3b move, the capacitance of the sensing capacitors c9p, c9n formed by the proof-masses and the metal thin film electrodes 9 on the glass sheets 71, 72 will change due to the distance change. The displacement (distance) of the proof-masses 3a, 3b can be calculated by measuring the capacitance difference between the sensing capacitors c9p, c9n. The output signal from the rotation rate is an alternating signal, and the output signal from the acceleration is a direct signal. These two signals can be separated by signal processing technology. The electrodes 9 of the sensing capacitors c9p, c9n can also be partitioned, as shown in FIG. 5b, into a feedback electrode 9f, and its bond pad 9fb for the gyroscope to rebalance the Coriolis force.

Figure 6:
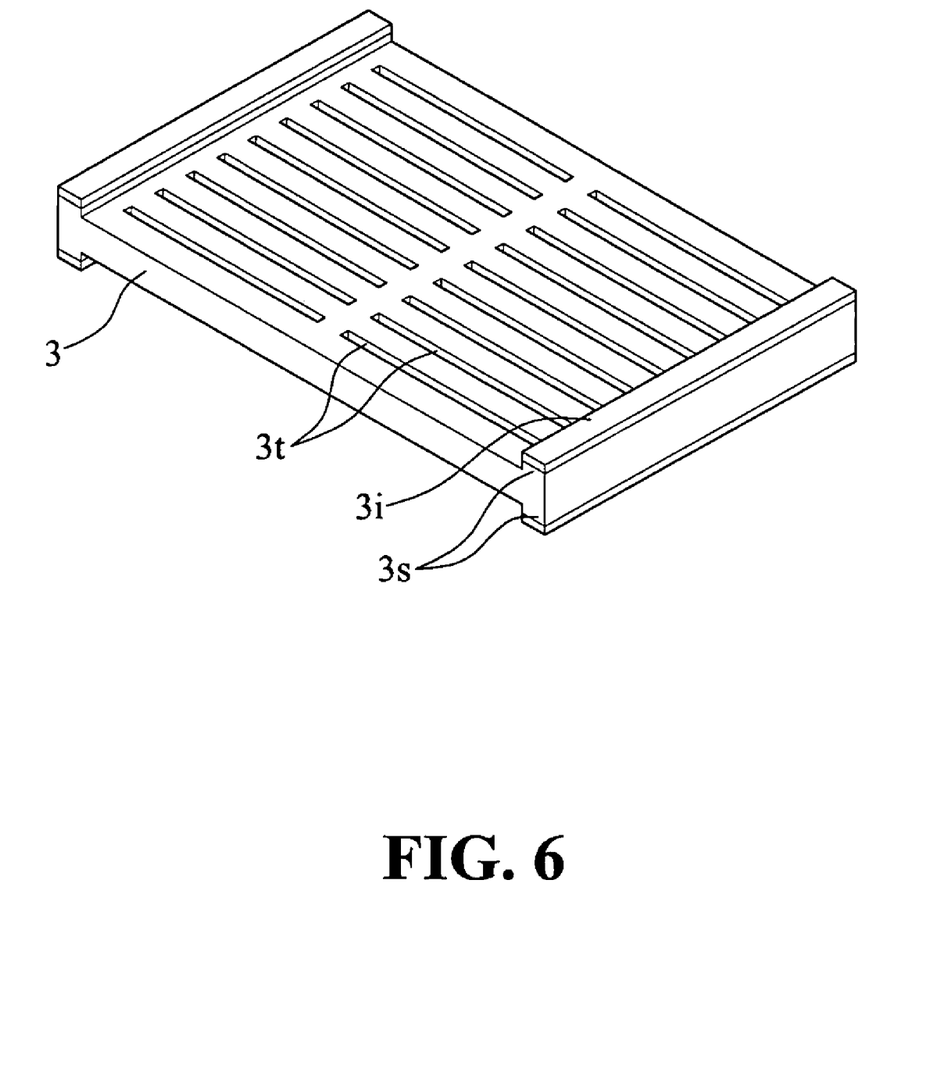
FIG. 6 shows the design of stickiness prevention and the design of reducing air damping on the proof-mass.

To reduce the air damping due to squeeze film caused by the vibration of the proof-mass 3, 3a or 3b along the z-axis and increase the resonance amplification ratio Q of the z-axis vibration system, the surface of the proof-mass 3 can be etched to form a plurality of long trenches or slits 3t parallel to the side of the proof-mass, as shown in FIG. 6. Because the present invention uses (110) silicon chip, which is easy for vertical deep etching, the etching of long trenches or slits will not use a large area for sensing capacitors, and can increase the sensitivity of the output signal, as compared with the (100) silicon case. If the air resistance is still too large, it must be partially vacuumized.

To avoid the stickiness problem in the process of bonding the silicon chip and the glass sheets, a plurality of small bumps 3s and its insulation layer 3i can be provided on the surface of the proof-mass 3 for separation, as shown in FIG. 6.

To enhance the bonding force between the silicon chip and the glass sheets, the part of the silicon chip which does not interfere with the movement of components should be kept as the connecting block 22 in FIG. 5.a to attach to the glass sheets.

To eliminate the impact of temperature on the output signals, and to improve the performance of the gyroscope and accelerometers, a small recessed area TS1 can be etched on the surfaces of the outer frame 2, the central anchor 21, or the connecting blocks 22. A metal thin film electrode TS2 is electroplated on the corresponding surface of the glass sheet, and connected to the bond pad TS to form a capacitor cTS for sensing temperature. Because it is affected by neither the rotation rate nor the acceleration, and only affected the temperature, it can be used to compensate for the input of the temperature on the capacitors c9p, c9n, which are for sensing the inertial force.

As shown in FIG. 5.a, because the silicon chip is electrically conductive, a small recessed slit st must be etched on the surfaces of the outer frame 2, where the thin film metal wire passes, in order to avoid short circuit.

Based on the design of the two embodiments, there can be many different designs and combinations. For example, the capacitor gap between the proof-mass and the two glass sheets can be replaced by recessed areas etched on the surface of the glass sheets. The layout of the resilient beams can also be varied, for example, the driving resilient beams 6 of the inner frame can also be connected to the outer frame 2.

In summary, the present invention discloses a dual inertial sensor made of a (110) silicon chip with vertical deep etching. The width of driving beam and the driving resonance frequency can be precisely controlled to improve the yield rate and the performance of the gyroscope. It also provides the other features: a design to reduce air resistance to improve the resonance amplification ratio of the sensing axis; a design for preventing the stickiness problem between the proof-mass and the glass sheets; and at least a built-in temperature sensing capacitor for real time measurement of temperature change in the chip to improve the temperature effect of the dual inertial sensors.

While we have shown and described the embodiment in accordance with the present invention, it should be clear to those skilled in the art that further embodiments may be made without departing from the scope of the present invention.

What is claimed is:

1. A silicon dual inertial sensor having a structure made of a (110) silicon chip with a bulk-micromachining method in a form of a parallelogram, said structure comprising:
   an outer frame;
   a central anchor;
   a plurality of connecting blocks;
   a first inner frame and a second inner frame each having a plurality of sensing beams connected to a proof-mass, and a plurality of driving beams connected to said outer frame or two common connection beams positioned at two sides of said proof-mass and then connected to said central anchor with a plurality of common supporting beams, each side of said first or second inner frame perpendicular to a y-axis forming a driver body which has a plurality of long trenches or slits formed perpendicular to the y-axis on each surface, said y-axis being in parallel with a surface of said silicon chip; and
   two insulation sheets connected to said outer frame, said central anchor and said connecting blocks, said insulation sheets being positioned respectively on a front side and a back side of said silicon chip, each insulation sheet having a plurality of metal thin film electrodes each being formed corresponding to a surface of a proof-mass of said first or second inner frame to form a sensing capacitor, and a plurality of electrode surface areas each being formed with two sets of stripe electrodes corresponding to a driver body of said first or second inner frame, said two sets of stripe electrodes being interposed to each other and in parallel to said long trenches or slits of the corresponding driver body to form two sets of driving capacitors;

wherein an electrostatic force is generated to make the proof-mass of said first inner frame and the proof-mass of said second inner frame move in opposite directions along said y-axis when an oscillating signal with a proper phase is imposed on each of said driving capacitors, a Coriolis force is generated to make the proof-mass of said first inner frame and the proof-mass of said second inner frame move in opposite directions along a z-axis perpendicular to the surface of said silicon chip when a rotation rate exists along an x-axis in parallel with the surface of said silicon chip, and the proof-mass of said first inner frame and the proof-mass of said second inner frame move in a same direction along said z-axis when an acceleration exists along said z-axis.

2. A silicon dual inertial sensor as in claim 1, wherein the front and back surfaces of said proof-mass comprise a plurality of bumps each with an insulation layer to prevent stickiness problem between said proof-mass and said insulation sheets.

3. A silicon dual inertial sensor as in claim 2, wherein the front and back surfaces of said proof-mass comprise a plurality of long recessed areas or slits parallel to any side of said proof-mass to reduce air resistance when said proof-mass vibrates along the z-axis.

4. A silicon dual inertial sensor as in claim 2, wherein the surfaces of said outer frame, said connecting blocks or said central anchor comprise at least a recessed area, and a corresponding metal thin film electrode is electroplated on said insulation sheets to form a temperature sensing capacitor.

5. A silicon dual inertial sensor as in claim 1, wherein the front and back surfaces of said proof-mass comprise a plurality of long recessed areas or slits parallel to any side of said proof-mass to reduce air resistance when said proof-mass vibrates along the z-axis.

6. A silicon dual inertial sensor as in claim 5, wherein the surfaces of said outer frame, said connecting blocks or said central anchor comprise at least a recessed area, and a corresponding metal thin film electrode is electroplated on said insulation sheets to form a temperature sensing capacitor.

7. A silicon dual inertial sensor as in claim 1, wherein the surfaces of said outer frame, said connecting blocks or said central anchor comprise at least a recessed area, and a corresponding metal thin film electrode is electroplated on said insulation sheets to form a temperature sensing capacitor.

8. A silicon dual inertial sensor as in claim 1, wherein the front and back surfaces of said proof-mass comprise a plurality of bumps each with an insulation layer to prevent stickiness problem between said proof-mass and said insulation sheets; the front and back surfaces of said proof-mass comprises a plurality of long recessed areas or slits parallel to any side of said proof-mass to reduce air resistance when said proof-mass vibrates along the z-axis; and the surfaces of said outer frame, said connecting blocks or said central anchor comprise at least a recessed area, and a corresponding metal thin film electrode is electroplated on said insulation sheets to form a temperature sensing capacitor.

9. A silicon dual inertial sensor as in claim 1, wherein the surface of each of said insulation sheets corresponding to each of said proof-mass comprise a metal thin film sensing electrode and a metal thin film electrode for a gyroscope feedback driver.

10. A dual inertial sensor having a structure made of a conductive material, said structure comprising:
    an outer frame;
    a central anchor;
    a plurality of connecting blocks;
    a first accelerometer and a second accelerometer each comprising an inner frame having a plurality of sensing beams connected to a proof-mass, and a plurality of driving beams connected to said outer frame, or two common connection beams positioned at two sides of said proof-mass and then connected to said central anchor with a plurality of common supporting beams, each side of said inner frame perpendicular to a y-axis forming a driver body which has a plurality of long trenches or slits formed perpendicular to the y-axis on each surface, said y-axis being in parallel with a surface of said conductive material; and
    two insulation sheets connected to said outer frame, said central anchor and said connecting blocks, said insulation sheets being positioned respectively on a front side and a back side of said conductive material, each insulation sheet having a plurality of electrode surface areas each being formed with two sets of stripe electrodes corresponding to a driver body of said inner frame, said two sets of stripe electrodes being interposed to each other and in parallel to said long trenches or slits of the corresponding driver body to form two sets of driving capacitors;
    wherein an electrostatic force is generated to make the proof-mass of said first accelerometer and the proof-mass of said second accelerometer move in opposite directions along said y-axis when an oscillating signal with a proper phase is imposed on each of said driving capacitors, a Coriolis force is generated to make the proof-mass of said first accelerometer and the proof-mass of said second accelerometer move in opposite directions along a z-axis perpendicular to the surface of said conductive material when a rotation rate exists along an x-axis in parallel with the surface of said conductive material, and the proof-mass of said first accelerometer and the proof-mass of said second accelerometer move in a same direction along said z-axis when an acceleration exists along said z-axis.

11. A dual inertial sensor as in claim 10, wherein said structure is made of a (110) silicon chip with bulk-micro-machining methods in a shape of a parallelogram.

12. A dual inertial sensor as in claim 10, wherein the front and back surfaces of said proof-mass comprise a plurality of bumps each with an insulation layer to prevent stickiness problem between said proof-mass and said insulation sheets.

13. A dual inertial sensor as in claim 12, wherein the front and back surfaces of said proof-mass comprise a plurality of long recessed areas or slits parallel to any side of said proof-mass to reduce air resistance when said proof-mass vibrates along the z-axis.

14. A dual inertial sensor as in claim 12, wherein the surfaces of said outer frame, said connecting blocks or said central anchor comprise at least a temperature sensor.

15. A dual inertial sensor as in claim 10, wherein the front and back surfaces of said proof-mass comprise a plurality of long recessed areas or slits parallel to any side of said proof-mass to reduce air resistance when said proof-mass vibrates along the z-axis.

16. A dual inertial sensor as in claim 15, wherein the surfaces of said outer frame, said connecting blocks or said central anchor comprise at least a recessed area, and a corresponding metal thin film electrode is electroplated on said insulation sheets to form a temperature sensing capacitor.

17. A dual inertial sensor as in claim 10, wherein the surfaces of said outer frame, said connecting blocks or said central anchor comprise at least a temperature sensor.

18. A dual inertial sensor as in claim 10, wherein the front and back surfaces of said proof-mass comprise a plurality of bumps each with an insulation layer to prevent stickiness problem between said proof-mass and said insulation sheets; the front and back surfaces of said proof-mass comprise a plurality of long recessed areas or slits parallel to any side of said proof-mass to reduce air resistance when said proof-mass vibrates along the z-axis; and the surfaces of said outer frame, said connecting blocks or said central anchor comprise at least a recessed area, and a corresponding metal thin film electrode is electroplated on said insulation sheets to form a temperature sensing capacitor.

* * * * *